United States Patent
Diaz et al.

(10) Patent No.: US 12,242,573 B2
(45) Date of Patent: Mar. 4, 2025

(54) BLOCKCHAIN-BASED LICENSE MANAGEMENT FRAMEWORK

(71) Applicant: BULL SAS, Les Clayes-sous-Bois (FR)

(72) Inventors: Fernando Diaz, Castilleja de la Cuesta (ES); Aurora Ramos, Valladolid (ES); Josep Martrat, Barcelona (ES)

(73) Assignee: BULL SAS, Les Clayes-sous-Bois (FR)

( * ) Notice: Subject to any disclaimer, the term of this patent is extended or adjusted under 35 U.S.C. 154(b) by 95 days.

(21) Appl. No.: 17/585,852

(22) Filed: Jan. 27, 2022

(65) Prior Publication Data

US 2022/0237267 A1  Jul. 28, 2022

(30) Foreign Application Priority Data

Jan. 28, 2021 (EP) .................................... 21154148

(51) Int. Cl.
*G06F 21/10* (2013.01)
*G06Q 20/38* (2012.01)
*G06F 9/54* (2006.01)

(52) U.S. Cl.
CPC ............ *G06F 21/105* (2013.01); *G06F 21/10* (2013.01); *G06Q 20/389* (2013.01); *G06F 9/54* (2013.01); *G06Q 2220/18* (2013.01)

(58) Field of Classification Search
CPC ....... G06F 21/105; G06F 9/54; G06Q 20/389; G06Q 2220/18
See application file for complete search history.

(56) References Cited

U.S. PATENT DOCUMENTS

2018/0314809 A1* 11/2018 Mintz .................... G06F 21/105
2020/0099591 A1*  3/2020 Clarke ............... H04L 41/0895
2020/0220791 A1*  7/2020 Aiello ...................... G06F 9/455

FOREIGN PATENT DOCUMENTS

WO  WO-2018109598 A1 *  6/2018  ............. G06F 21/64

OTHER PUBLICATIONS

European Search Report issued in EP21154148.7.8, dated Jun. 30, 2021 (7pages).

* cited by examiner

*Primary Examiner* — Jamie R Kucab
(74) *Attorney, Agent, or Firm* — ARC IP Law, PC; Joseph J. Mayo (57) ABSTRACT

Systems and methods are described for license management. A system for license management includes a smart contract that records a licensing agreement between a first party and a second party on usage of a network function. The smart contract is persisted in a trade blockchain. The system also includes an e-licensing manager agent. The e-licensing manager agent retrieves the licensing agreement from the smart contract. The e-licensing manager agent monitors a usage of the network function by the second party in real-time based on the licensing agreement, record actions of the usage of the network function, and create a transaction record based on the recorded actions in an operation blockchain.

15 Claims, 6 Drawing Sheets

BLOCKCHAIN-BASED LICENSE MANAGEMENT FRAMEWORK

This application claims foreign priority to European Patent Application No. EP21154148.7 filed on 28 Jan. 2021, the specification of which is hereby incorporated herein by reference.

BACKGROUND OF THE INVENTION

Field of the Invention

The invention generally relates to systems and methods for license management framework. In particular, the systems and methods relate to blockchain-based license management framework for automatically managing licenses.

A trend a software disruption has been caused by 'softwarization' of hardware. Also, with virtualization, and XaaS (Anything as a Service), hardware, software, and/or network functions are being provided as offerings in a manner similar to software products by vendors. The offerings are may be deployed in any computing environment. The offerings can be rapidly replicated and deployed over the network. With regards to the telecommunication sector. Network Function Virtualization (NFV) technology has enabled virtualization of network functions that encompass Virtual Network Functions (VNFs), Cloud-Native Network Functions (CNFs) and/or network functions composed by several VNEs/CNFs. The network functions are softwarized network functions that can be instantiated and replicated rapidly due to the NFV technology in a multi-domain ecosystem. However, such agility increases the challenge of license control and management.

Conventional licensing solutions are designed mostly for software solutions that are developed by one or more organizations. For example, the conventional licensing solutions involve leveraging a use of licensing keys, managed through licensing pooling. In response to a request from a service provider for a license for using a service offering, the conventional licensing solutions activate a license, locking a usage of the service offering until a licensing entitlement is exhausted. This licensing procedure adds overheads in terms of flexibility of deployments of the service, where flexibility is a requirement for an efficiency of a network. Some conventional licensing solutions require a vendor licensing manager to continuously monitor the licensing entitlement of their services running inside the vendor's domain. To monitor and manage the vendor licensing manager, a vendor may deploy a lightweight server in the operators' domain to ensure a correct license and periodic synchronizations to reflect eventual changes in the license keys. Such deployment of lightweight servers in the operators' domains adds to operational overhead of the vendor, thereby increasing costs. Some conventional licensing solutions involve human-based management, such as, for example, updating a vendor manager database. in real-world situations, where a service provider may require offerings from several different vendors, and some of the softwares may be rapidly scaled up/down, the human-based operator may not be able to efficiently manage the vendor manager database. Also, the human-based management of the vendor manager database may be prone to errors leading to inaccurate revenue management.

Accordingly, it is one object of one or more embodiments of the invention to provide systems and methods for a blockchain-based license management framework that provides capabilities for license management in a transparent and flexible manner and on a secure platform.

BRIEF SUMMARY OF THE INVENTION

At least one embodiment of the invention generally relates to systems and methods for license management.

In at least one embodiment of the invention, a system for license management includes a smart contract configured to record a licensing agreement between a first party and a second party to license a usage of a network function or a set of network functions. The smart contract is persisted in a trade blockchain. The system also includes an e-licensing manager agent communicatively coupled to the network function and the trade blockchain. The e-licensing manager agent includes an agreement Application Program Interface (API), a watcher and a control API. The agreement API is configured to retrieve the licensing agreement from the smart contract. The watcher is configured to monitor a usage of the network function by the second party in real-time based on the terms and conditions in the licensing agreement, and record actions of the usage of the network function by the second party. The control API is configured to create a transaction record based on the recorded actions in an operation blockchain.

The e-licensing manager agent further includes a watcher Lifecycle Manager (LCM) configured to manage a lifecycle and configuration of the watcher, receive the actions recorded by the watcher, and communicate the recorded actions to the control API to create the transaction record. The e-licensing manager agent may be configured to control the usage of the network function by the second party.

The e-licensing manager agent further comprises a translator configured to analyze the licensing agreement and outline the terms and conditions of the licensing agreement to the watcher.

The watcher may be further configured to perform a real-time audit of the network function for operational decisions.

The e-licensing manager agent is further configured to generate a private ledger stored by nodes in the trade blockchain and the operation blockchain, the private ledger being limited to the first party and the second party, the private ledger storing the transaction records the first party and the second party.

The e-licensing manager agent further includes a watcher generator configured to generate the watcher before the deployment of the network function.

The e-licensing manager agent further includes a blockchain API configured to create a negotiation record in the smart contract based upon negotiations between the first party and the second party for the licensing agreement.

The system includes an e-licensing manager configured to monitor the e-licensing manager agent to maintain a context of usage of a plurality of network functions The e-licensing manager further includes a notification unit configured to notify the first party and the second party in response to at least one of an expiration of a term of the licensing agreement and a breach of the terms and conditions of the licensing agreement.

The e-licensing manager is further configured to calculate and generate an invoice based on the usage of the network function by the second party.

A computer-implemented method for license management is disclosed, according to one or more embodiments of the invention. The method is implemented in a computer system having one or more physical processors programmed with computer program instructions that, when executed by the one or more physical processors, cause the computer system to perform the method. The method includes recording a licensing agreement between a first party and a second party on usage of a network function in a smart contract. The method also includes persisting the smart contract in a trade blockchain. The method further includes retrieving the licensing agreement from the smart contract. The method further includes monitoring the usage of the network function. The method also includes recording actions of the usage associated with the network function. In addition, the method includes creating a transaction record based on the recorded actions in an operation blockchain.

The method may include analyzing the licensing agreement and outlining the terms and conditions of the licensing agreement for the monitoring.

The method may include notifying the first party and the second party in response to at least one of expiration of a term of the licensing agreement and a breach of the terms and conditions of the licensing agreement.

The method may include creating a negotiation record in the trade blockchain-based upon negotiations between the first party and the second party for the licensing agreement.

Other aspects and advantages of the disclosure will become apparent from the following detailed description, taken in conjunction with the accompanying drawings, which illustrate by way of example the teachings of the disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION OF THE INVENTION

Prior to discussing the one or more embodiments of the invention, it may be helpful to describe aspects of the operating environment as well as associated system components (e.g., hardware elements) in connection with the methods and systems described herein.

Figure 1:
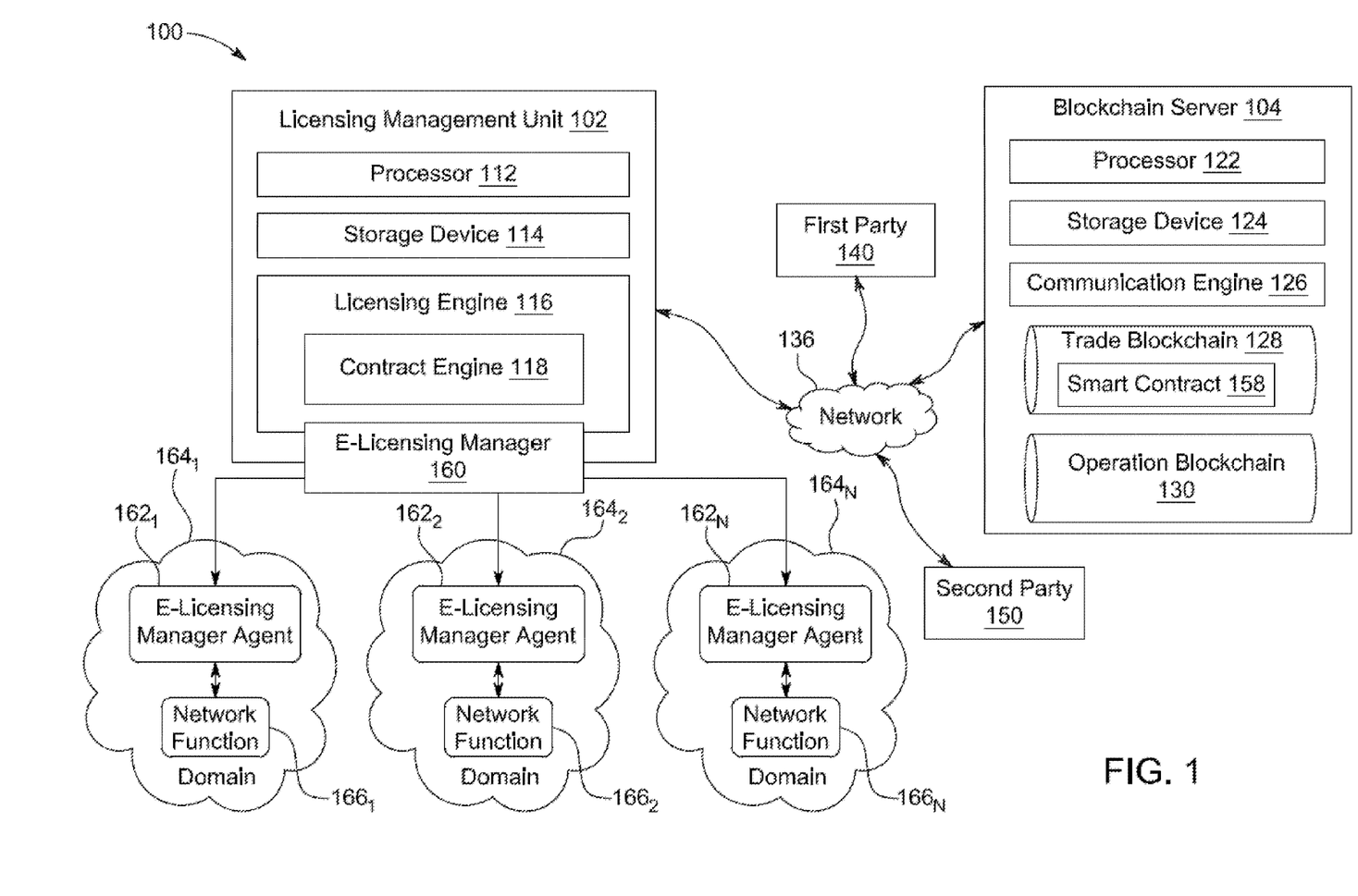
FIG. 1 is a block diagram depicting a network environment comprising a license management unit and a blockchain server, according to one or more embodiments of the invention.

Referring to FIG. 1, at least one embodiment of a network environment 100 is depicted. In a brief overview, the network environment 100 includes a licensing management unit 102, a blockchain server 104, a first party 140, and a second party 150 communicatively coupled to each other through a network 136.

The licensing management unit 102 and the blockchain server 104 may be any computing device configurable to run instructions. For example, the licensing management unit 102 and the blockchain server 104 may include, without limitation, a server (e.g., having one or more server blades, processors, etc.), a computer (e.g., a desktop computer, a laptop computer, etc.), a smartphone, a tablet computing device, and/or other device. The licensing management unit 102 and the blockchain server 104 may be deployed as and/or executed on any type and form of computing device, e.g., a computer, network device or appliance capable of communicating on any type and form of network and performing the operations described herein. In one or more embodiments, the licensing management unit 102 and the blockchain server 104 may be implemented as servers. In one or more embodiments, the servers may be physical servers serving a dedicated customer or user, on-premise servers installed at customer facility, virtualization servers hosting a plurality of virtual machines (VMs), or hybrid servers, i.e., physically hosted servers with virtualization technology. Furthermore, in one or more embodiments of the invention, the licensing management unit 102 and the blockchain server 104 may be hosted in cloud computing platforms provided by various cloud service providers such as Google Cloud Platform™, Amazon Web Services™ (AWS), Microsoft Azure®, IBM Cloud®, Oracle Cloud Dell Cloud®, and VMware®. In at least one embodiment of the invention, the licensing management unit 102 may be configured as a component of the blockchain server 104 or vice-versa. One or more embodiments may include more than one of each the licensing management unit 102 and the blockchain server 104. A person of ordinary skill in the art will recognize that various features and functions of the disclosed license management system may be performed at different locations without departing from this disclosure.

The licensing management unit 102 may include a processor 112 (also interchangeably referred to herein as processors 112), a storage device 114 (also interchangeably referred to herein as storage devices 114), and a licensing engine 116, among other components (not shown for brevity). The licensing engine 116 may include a contract engine 118. Processors 112 may be programmed by one or more computer program instructions. For example, in one or more embodiments, processors 112 may be programmed by instructions included in the licensing engine 116 and the contract engine 118, as well as other components and/or other instructions.

The licensing engine 116 provides licensing solutions for requesting parties to license a usage of network functions or instances of network function $166_{1-N}$ (hereinafter referred to as network function $166_{1-N}$ or network functions $166_{1-N}$ or instances of network function $166_{1-N}$ ). In at least one embodiment, the licensing engine 116 may be an Atos™ licensing solution. The licensing engine 116 provides capabilities to requesting parties to interact in a transparent, flexible, and secure platform. The requesting parties may include a vendor(s) (hereinafter referred to as the first party 140 or the first parties 140) and a service provider(s) (hereinafter referred to as the second party 150 or the second parties 150). The first party 140 may offer the network function(s) $166_{1-N}$ for a license through the licensing engine 116. The network function $166_{1-N}$ is a virtualized or softwarized network element that can be deployed in a computing environment. Also, the network function $166_{1-N}$ may be replicated and deployed rapidly. Examples of network functions include signaling elements, tunneling gateway elements, set-top units, edge devices, traffic analysis elements, load balancers, mobile network nodes, network-wide functions, security functions, and such elements. The first party 140 may be a network function provider. The second party 150 may be a service provider requiring the network function $166_{1-N}$ to provide services to end-users.

The contract engine 118 may support the first party 140 and the second party 150 by providing a platform to support negotiations, finalizing, and signing of agreements such as licensing agreement(s). In one or more embodiments, the contract engine 118 may suggest to the first party 140 and/or the second party 150, terms and conditions for a licensing agreement(s), based on rules and conditions for the use of the network function $166_{1-N}$ provided by the first party 140, and requirements of the network function $166_{1-N}$ usage by the second party 150. For example, in at least one embodiment, contract engine 118 may be configured to suggest terms and conditions such as limitations, warranties, rates, length of the license, and such terms and conditions for the licensing agreement(s). The contract engine 118 may support granularity of terms and conditions for the licensing agreement(s) that may be implemented in the smart contract 158. In one or more embodiments, the contract engine 118 may recommend and draft the terms and conditions for the licensing agreement(s) that meets the requirements of the first party 140 and the second party 150. By suggesting terms and conditions for licensing agreement(s) that may be reasonable and/or agreeable to the first party 140 and the second party 150, the contract engine 118 may significantly reduce the time and expense otherwise required in the negotiation of such agreement(s). Also, the first party 140 and/or the second party, with little or no experience in negotiating the licensing agreements associated with network functions, may be able to use the licensing management unit 102 to develop initial contract terms to negotiate without significant efforts.

Based on the finalized licensing agreement(s), in at least one embodiment, the contract engine 118 may provide instructions to the processor 112 to record a smart contract 158. A granularity of terms and conditions in the smart contract may be provided by the first party 140 and/or the second party 150. The recording may include generating a code based on the licensing agreement(s). The instructions to the contract engine 118 may include, without limitation, instructions for preparing and executing the smart contract 158 between the first party 140, the second party 150 and/or any other parties involved (if any). The instructions to the contract engine 118 may also include, without limitation, instructions for updating a trade blockchain 128 in the blockchain server 104 by creating a datablock having a record of negotiations, and/or other instructions that the licensing management unit 102 to perform various license management operations. In one or more embodiments, the instructions to the contract engine 118 may include the instructions that may be executed by the licensing management unit 102 as well. The smart contract 158 includes the licensing agreement between the first party and the second party, comprising terms and conditions on usage of the network function $166_{1-N}$. In one or more embodiments, the smart contract 158 reflects the licensing agreement between the first party 140, the second party 150 and/or any other party involved (if any). The smart contract 158 enables a deployment of the network function $166_{1-N}$ from the trade blockchain 128 through one or more orchestrators (for example, Management And Network Orchestrator) based on the terms and conditions of the licensing agreement. The smart contract 158 enables the second party to use the network function $166_{1-N}$ based on the terms and conditions of the licensing agreement(s).

The licensing engine 116 provides a mechanism to manage the license of the network function $166_{1-N}$ post the generation of the smart contract 158. The licensing engine 116 may include one or more electronic licensing manager agents $162_{1-N}$ (hereinafter referred to as e-licensing manager agent(s) $162_{1-N}$) for management of the license for usage of the network function $166_{1-N}$. In one or more embodiments, the e-licensing manager agent $162_{1-N}$ may be built over a layer of an orchestrator(s), making the mechanism agnostic of Network Function Virtualization Orchestrators (NFVO). With the e-licensing manager agent $162_{1-N}$ being NFVO agnostic, deployment of the network function $166_{1-N}$ and control the network function $166_{1-N}$ is independent from underlying virtualization infrastructure. Also, the e-licensing manager agent $162_{1-N}$, the trade blockchain 128, and an operation blockchain 130 may have programmatic interfaces such as Application Programming Interface to enable seamless integration and interaction between each other. For every instance of the network function $166_{1-N}$ initiation, the licensing engine 116 may generate a corresponding e-licensing manager agent $162_{1-N}$ for managing the license for the instance of the network function $166_{1-N}$. The each of the network function $166_{1-N}$ may be deployed in an operator domain. The operator domain may be the second party's domain or the third party's domain. Each of the e-licensing manager agent $162_{1-N}$ may be deployed inside a corresponding second party's domain or the third party's domain. Each of the e-licensing manager agent $162_{1-N}$ controls the network function $166_{1-N}$ deployed in the corresponding domain. For example, the e-licensing manager agent $162_1$ deployed in the second party's domain $164_1$ controls the network function $166_1$. In another example, the e-licensing manager agent $162_2$ deployed in the third party's domain $164_2$ controls the network function $166_2$. Similarly, the e-licensing manager agent $162_N$ deployed in the domain $164_N$ controls the network function $166_N$.

In one or more embodiments, the licensing engine 116 may automatically generates the e-licensing manager agent $162_{1-N}$ in response to the generation of the smart contract 158. In at least one embodiment, the licensing engine 116 may generate the e-licensing manager agent $162_{1-N}$ in response to initiation by the first party 140. In another implementation, the licensing engine 116 may generate the e-licensing manager agent $162_{1-N}$ in response to initiation by the second party 140 to use the network function $166_{1-N}$. In one or more embodiments, the e-licensing manager agent $162_{1-N}$ is generated before the deployment of the network function $166_{1-N}$. In at least one embodiment, the e-licensing manager agent $162_{1-N}$ may be implemented in the first party's domain. In at least one embodiment, the e-licensing manager agent $162_{1-N}$ may be implemented in the second party's domain. In at least one embodiment, the e-licensing manager agent $162_{1-N}$ may be implemented in a third party's domain. A third party may be an infrastructure provider who may provide required processing and storage resources for the second party 150 to scale up services by requesting or enabling deployment of required instances of the network function $166_{1-N}$. Having the e-licensing manager agent $162_{1-N}$ installed inside the second party's domain or the third party's domain provides the first party 140 to control the usage of network function $166_{1-N}$ by the second party 150, and provide licensing schemas to the second party 150. Also, with the network function $166_{1-N}$ being deployed in the second party's domain or the third party's domain, the e-licensing manager agent $162_{1-N}$ is configured to control the usage of network function $166_{1-N}$ based on the licensing agreement(s) reflected in the smart contract 158, with no blockage on usage of network function $166_{1-N}$.

In one or more embodiments, the licensing engine 116 may provide an electronic licensing manager 160 (hereinafter referred to as e-licensing manager 160) to manage e-licensing manager agent $162_{1-N}$. The licensing manager 160 may enable scaling up or scaling down instances of e-licensing manager agent(s) $162_{1-N}$ based on scaling up or scaling down of the instances of network functions. The licensing manager 160 may manage multiple e-licensing manager agents, with each e-licensing manager agent monitoring a separate network function $166_{1-N}$ or a different instance of the network function $166_{1-N}$. The e-licensing manager 160 is elaborated in FIG. 3 in more detail. The licensing manager 160 may obtain full context of the usage of the network function $166_{1-N}$ from the e-licensing manager agent(s) $162_{1-N}$. Based on the contexts and the transaction records of actions including the usage of the network function $166_{1-N}$ by the second party 150, the licensing manager 160 may calculate a fee and generate invoice(s) to the second party 150. The e-licensing manager 160 uses a purely metric-based approach to calculate the fee based on the usage of the network function $166_{1-N}$, and terms and conditions laid out in the licensing agreement(s).

The blockchain server 104 may be a database management system having several nodes (not shown) configured to catalog, track communications, actions, related transactions, and licensing agreements associated with the network function $166_{1-N}$ in the trade blockchain 128 using cryptographically verified blockchain ledger technology. The blockchain server 104 may include a processor 122 (also interchangeably referred to herein as processors 122), a storage device 124 (also interchangeably referred to herein as storage devices 124), a communication engine 126, the trade blockchain 128, and the operation blockchain 130, among other components (not shown for brevity). The communication engine 126 may receive transaction related communications from the contract engine 118, the e-licensing manager 160, and the e-licensing manager agent(s) $162_{1-N}$ of the licensing management unit 102, record the smart contract 158 in the trade blockchain 128, place the negotiation records in the trade blockchain 128 and place the transaction records in the operation blockchain 130 through the processor 122, based on consent of the first party 140 and the second party 150. The trade blockchain 128 and the operation blockchain 130 may be a database or a cryptographically verified digital ledger of transactions that stores, for example, the negotiation records, the transaction records, additional communications, related transactions, and licensing agreement(s) associated with the network function $166_{1-N}$. The blockchain server 104 may generate a private ledger (not shown) stored by nodes in the trade blockchain 128 and the operation blockchain 130. The private ledger may be open and accessible to the first party 140 and the second party 150. The private ledger may store the negotiation records, and the smart contract 158 in the trade blockchain 128, and the transaction records in the operation blockchain 130. Explanation of the blockchain technology is not provided in detail for the sake of brevity.

In operation, in at least one embodiment of the invention, the licensing management unit 102 may enable the first party 140 and the second party 150 to use a licensing service for using the network function $166_{1-N}$. The licensing management unit 102 may provide a platform to the first party 140 to register as a vendor and onboard the network functions, exposing capabilities, licensing constraints, and any terms and conditions for licensing agreement(s). To provide flexibility for onboarding the network functions for the first party 140, the licensing management unit 102 may support several business models in smart contract templates. Some examples of the licensing terms may include a flat subscription model, a pay-as-you-grow model, a fixed period subscription model, and such other models. The flat subscription model provides the second party 150, an agreement to contract a part or a complete set of features of the network function $166_{1-N}$ without considering a time period or usage of the network function $166_{1-N}$. The pay-as-you-grow model provides an option to the second party 150 to pay as per use based on increase or decrease in usage of the network function $166_{1-N}$. In the pay-as-you-grow model, a final cost may be calculated based on one or several customized conditions of the usage of the network function $166_{1-N}$, such as, number of instances of the network function $166_{1-N}$ or the number of active users within a given time duration. The fixed period subscription model provides the second party 150 a right to use the network function $166_{1-N}$ for a fixed period of time. The licensing terms that are not provided are contemplated herein.

Similarly, in at least one embodiment, the licensing management unit 102 may provide the platform to the second party 150 to register as a service provider. In one or more embodiments, the licensing management unit 102 may provide options for the first party 140 and the second party 150 to negotiate for terms and conditions of licensing agreement(s) for usage of the network function $166_{1-N}$. The first party 140 and the second party 150 may have to formally agree by approving the license agreement having the terms and conditions to use the licensing system. In response to the first party 140 and the second party 150 formally agreeing to the terms and conditions to provide a license to use the network function $166_{1-N}$, the contract engine 118 may record the smart contract 158 based on the licensing agreement(s) in the trade blockchain 128. The contract engine 118 may persist the smart contract 158 in a datablock of the trade blockchain 128. In one or more embodiments, the negotiations, related communications, and the smart contract 158 may be stored as a negotiation record in the trade blockchain 128. The smart contract 158 facilitates, verifies, and enforces the negotiation of the licensing agreement comprising the terms and conditions. In response to the generation of the smart contract 158, the second party is enabled to use the network function $166_{1-N}$ in a second party's domain and/or a third-party's domain.

In at least one embodiment, the licensing engine 116 generates the e-licensing manager 160 and the e-licensing manager agent $162_{1-N}$ in response to the generation of the smart contract 158. The e-licensing manager agent $162_{1-N}$ is configured to retrieve the licensing agreement(s) from the smart contract 158 associated with the network function $166_{1-N}$. In one or more embodiments, the e-licensing manager agent $162_{1-N}$ may analyze the terms and conditions of the licensing agreement(s) associated with the usage of the network function $166_{1-N}$. Based on the terms and conditions of the licensing agreement, the e-licensing manager agent $162_{1-N}$ may monitor a usage of the network function by the second party 150 in real-time and verify compliance of the smart contract 158. In response to any actions of the usage of the network function $166_{1-N}$ by the second party 150, the e-licensing manager agent $162_{1-N}$ may record such actions. The actions may include usage of the instance of the network function $166_{1-N}$ within the terms and conditions of the licensing agreement, usage of the instance of the network function $166_{1-N}$ outside the scope of licensing agreement(s), violation of the terms and conditions, and such other actions. The e-licensing manager agent $162_{1-N}$ may use the recorded actions to create a transaction record to be persisted in a blockchain managed by the blockchain server 104. As a result of real-time monitoring by the e-licensing manager agent $162_{1-N}$, there is no requirement of periodical synchronizations to external endpoints. The e-licensing manager agent 160 is elaborated in FIG. 2. The e-licensing manager 160 may manage the e-licensing manager agents $162_{1-N}$, obtain context of the network functions $166_{1-N}$, calculate fee for the usage of the network function $166_{1-N}$ by the second party 150 and generate an invoice for the second party 150.

In one or more embodiments, the licensing management unit 102 may provide flexibility to the first party 140 to implement various business strategies. The first party 140 and/or the second party 150 may agree on granularity of the terms and conditions covering the business strategy and usage of the network function in the licensing agreement(s). For example, in at least one embodiment, the first party 140 may be offering to provide ten instances of the network function $166_{1-N}$ for a certain consideration or price to the second party 150. Post the usage of the ten instances, the first party 140 may increase the pricing based on the number of instances deployed based on requests of the second party 150. Such terms and conditions may be covered in granular form in the licensing agreement(s). In another example, in one or more embodiments, an other first party 140 may follow the strategy of offering a different network function with a pricing depending on a business logic such as, a number of data in Gigabyte (GB) stored in a network function or a number of users connected to the network function. To determine a current state of usage of the network function $166_{1-N}$, the e-licensing manager agent $162_{1-N}$ may be configured to audit the network function $166_{1-N}$ to determine operational aspects and business logic aspects.

Due to the nature of smart contracts and blockchains, in one or more embodiments, transparency and security are granted in the agreements where the first party and the second party agree to the terms and conditions of the licensing agreement(s) for a usage of the network function $166_{1-N}$. System and method provided by the license management framework implemented by the licensing management unit 102 and the blockchain server 104 enables the first party 140 and the second party 150 to exercise their agility during a process of contracting and usage of the network functions, with mechanisms that enable the security and the accuracy in the costs of payments. Also, the disclosed license management framework allows the usage of the software without blocking processes and track the usage of every network function instance with on-demand granularity reflected in the licensing agreement(s).

Although the above description describes about the smart contract 158 related to single network functions $166_{1-N}$ between the first party 140 and the second party 160 (and the third party), in one or more embodiments, the smart contract 158 can be related or be potentially be composed of several network functions from multiple or different first parties, multiple second parties and the third parties. Also, in at least one embodiment, smart contracts' validity may not depend on external authorities, since the smart contract 158 is a public code that is persisted in the trade blockchain 128 and shared to the first party 140 and the second party 150 in the network, so the trade between the first party 140 and the second party 150 are completely secure and autonomous.

With the use of blockchain technology to manage the licensing of usage of the network function $166_{1-N}$, integrity and no repudiation of the licensing control is guaranteed. Furthermore, in at least one embodiment, privacy is assured since that transactional records and contents of blocks in the blockchain are hashes of different operations performed by the first party 140 and the second party 150, and the actions are stored off the blockchain and are only visible to the first party 140 and the second party 150.

In one or more embodiments, the licensing management unit 102, the blockchain server 104, the first party 140 and the second party 150 may be communicatively connected to each other through the network 136. The network 136 may be connected via wired and/or wireless links, in at least one embodiment. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, 5G or any other standard. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1xRTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In one or more embodiments, different types of data may be transmitted via different links and standards. In one or more embodiments, the same types of data may be transmitted via different links and standards.

The one or more networks may be any type and/or form of network, in at least one embodiment. The geographical scope of the network may vary widely, and the one or more networks can be a body area network (BAN), a personal area network (PAN), a local-area network (LAN), e.g., Intranet, a metropolitan area network (MAN), a wide area network (WAN), or the Internet. The topology of one or more networks may be of any form and may include, e.g., any of the following: point-to-point, bus, star, ring, mesh, or tree. The one or more networks may be an overlay network that is virtual and sits on top of one or more layers of other networks. The one or more networks may be of any such network topology as known to those ordinarily skilled in the art capable of supporting the operations described herein. The one or more networks may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The one or more networks may be a type of broadcast network, a telecommunications network, a data communication network, or a computer network.

Figure 2:
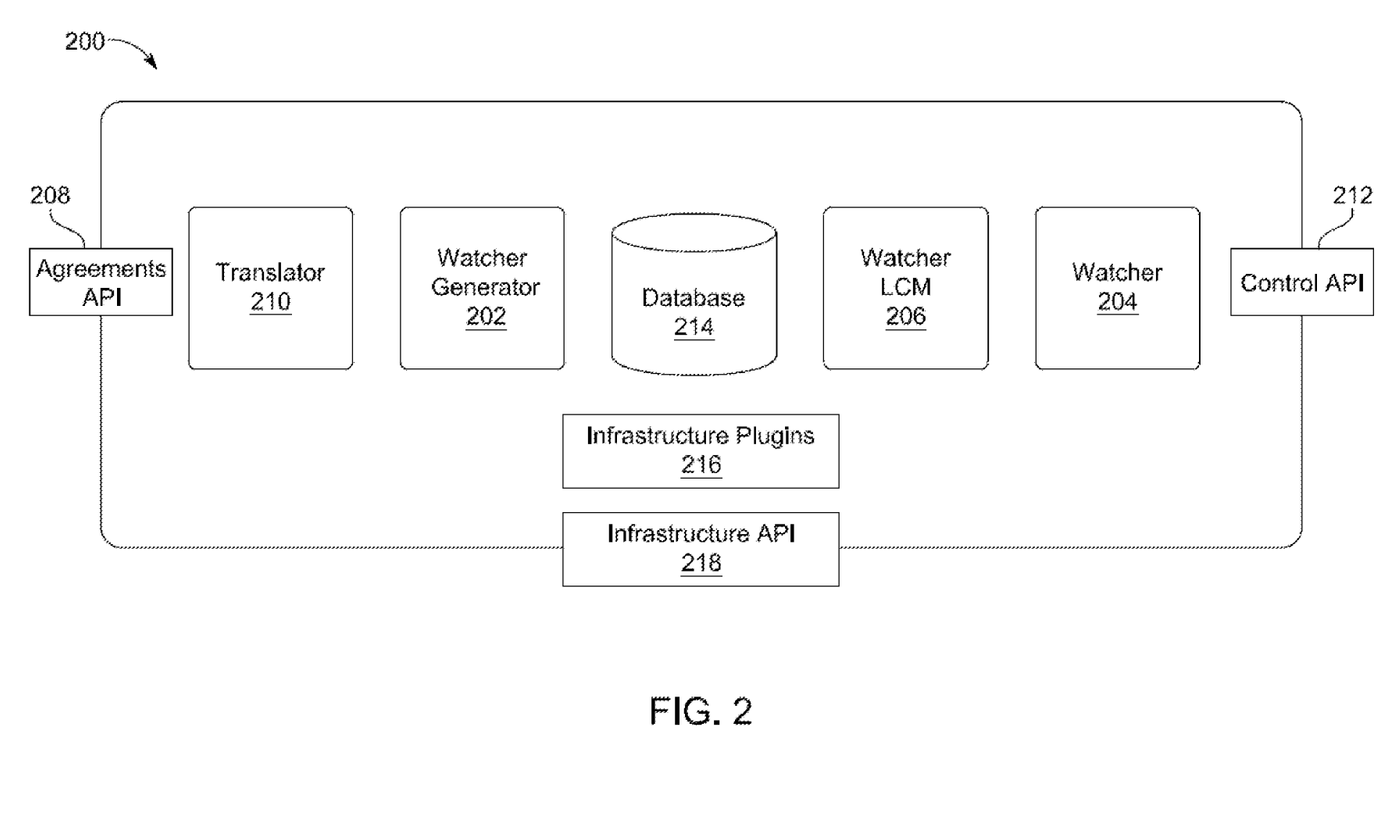
FIG. 2 is a block diagram depicting an e-licensing manager agent, according to one or more embodiments of the invention.

FIG. 2 is a block diagram depicting an exemplary implementation of an e-licensing manager agent 200, according to one or more embodiments. The e-licensing manager agent 200 may correspond to the e-licensing manager agent 162.

The e-licensing manager agent 200 may include a watcher generator unit 202, a watcher 204, a watcher Lifecycle Manager (LCM) 206, an agreement Application Program Interface (API) 208, a translator unit 210, a control API 212, a database 214, an infrastructure plugin 216 and an infrastructure API 218.

The watcher generator unit 202 is configured to generate the watcher 204, in one or more embodiments. The watcher 204 may be a piece of code or logic to monitor a usage of a network function based on terms and conditions of the licensing agreement(s). In one or more embodiments, the watcher generator unit 202 generates the watcher 204 before a deployment of a network function such as the network function $166_{1-N}$. In one or more embodiments, the watcher generator unit 202 generates the watcher 204 at a time of deployment of the network function. The watcher LCM 206 is a piece of code or logic to manage the watcher 204 in terms of lifecycle and configuration. For example, in at least one embodiment, the watcher LCM 206 may determine a life span and configures functions of the watcher 204 to monitor and report back actions of network usage by the second party 150.

The e-licensing manager agent 200 uses the agreement API 208 to retrieve the licensing agreement reflected in the smart contract 158 associated with the network function from the trade blockchain 128. The agreement API 208 may be a software intermediary that enables the e-licensing manager agent 200 and the trade blockchain 128 to exchange information. The e-licensing manager agent 200 provides the retrieved licensing agreement(s) to the translator unit 210. The translator unit 210 analyzes the licensing agreement(s) and outlines the terms and conditions of the licensing agreement(s) to the watcher 204. Based on the terms and conditions in the licensing agreement(s), the watcher 204 monitors the usage of the network function by the second party 150 in real-time. For example, in one or more embodiments, the watcher 204 monitors whether the second party 150 is using the network function in accordance with the terms and conditions, whether there are violations in the usage of the network function, and such usage. In one or more embodiments, the watcher 204 may detect actions of the usage of the network function by the second party 150. In one or more embodiments, the infrastructure plugins 216 provides compatibility with different compatible Network Function Virtualization Orchestrators (NFVOs). The infrastructure API 218 may monitor and/or communicate with the NFVOs to determine what the NFVOs does with the network function and generate an invoice depending on the network usage. The infrastructure API 218 may capture and provide signaling associated with the actions by the second party 150 to the watcher 204. For example, whenever there is a usage of the network function by the second party 150, there may be changes in events. Consider an example of a network function such as a virus scanner. The actions associated with the virus scanner may include start scan, termination of scan, request for scan report, quarantine suspicious files, etc. The watcher 204 may be configured to detect actions such as starting scan, termination of the scan, length of time of a scan, request for report, etc.

The watcher 204 may record actions of the usage of the network function, in one or more embodiments. The watcher LCM 206 may receive the actions recorded by the watcher 204. The watcher LCM 206 may communicate the recorded actions to the control API 212 to create a transaction record in the operation blockchain 130. Considering the example of the virus scanner described above, the watcher LCM 206 may communicate the recorded actions to the control API 212 to create a transaction record of the virus scan action on a given day and time in the operation blockchain 130. In one or more embodiments, the watcher LCM 206 may communicate the recorded actions periodically. In one or more embodiments, the watcher LCM 206 may communicate the recorded actions after reaching a threshold number of recordings. The control API 212 may create the transaction record in the operation blockchain 130 through a control API of a blockchain layer. The control API 212 may be a software intermediary that enables the e-licensing manager agent 200 and the operation blockchain 130 to exchange information.

In one or more embodiments, the watcher 204 may be configured to perform a real-time audit of the network function for operational aspects and/or for monitoring business logic. The operational aspects include scaling up or scaling down decisions from the network function virtualization orchestrator (NFVOs), time of usage of the network function, and such operational aspects. In one or more embodiments, the infrastructure plugins 216 may provide operational aspects by translating specific formats of requests for compatible Network Function Virtualization Orchestrators (NFVOs). The business logic aspect may include information on a number of users connected to the network function, database or storage offered, and such business aspects. The watcher LCM 206 may receive a result of the audit and may communicate the result to the control API 212 to create a transaction record in the operation blockchain 130.

The database 214 of the e-licensing manager agent 200 may be a repository comprising a licensing registry to store information such as licensing information associated with the network function instance, management of the network function instances, and terms and conditions associated with usage of the network function instance. In one or more embodiments, the database 214 may also include information required for configuration of the e-licensing manager agent 200, the first party 140 and the second party 150. In one or more embodiments, the e-licensing manager agent 200 may include an interface to provide context of the usage of the network function to a corresponding e-licensing manager. The e-licensing manager is described in FIG. 3.

Figure 3:
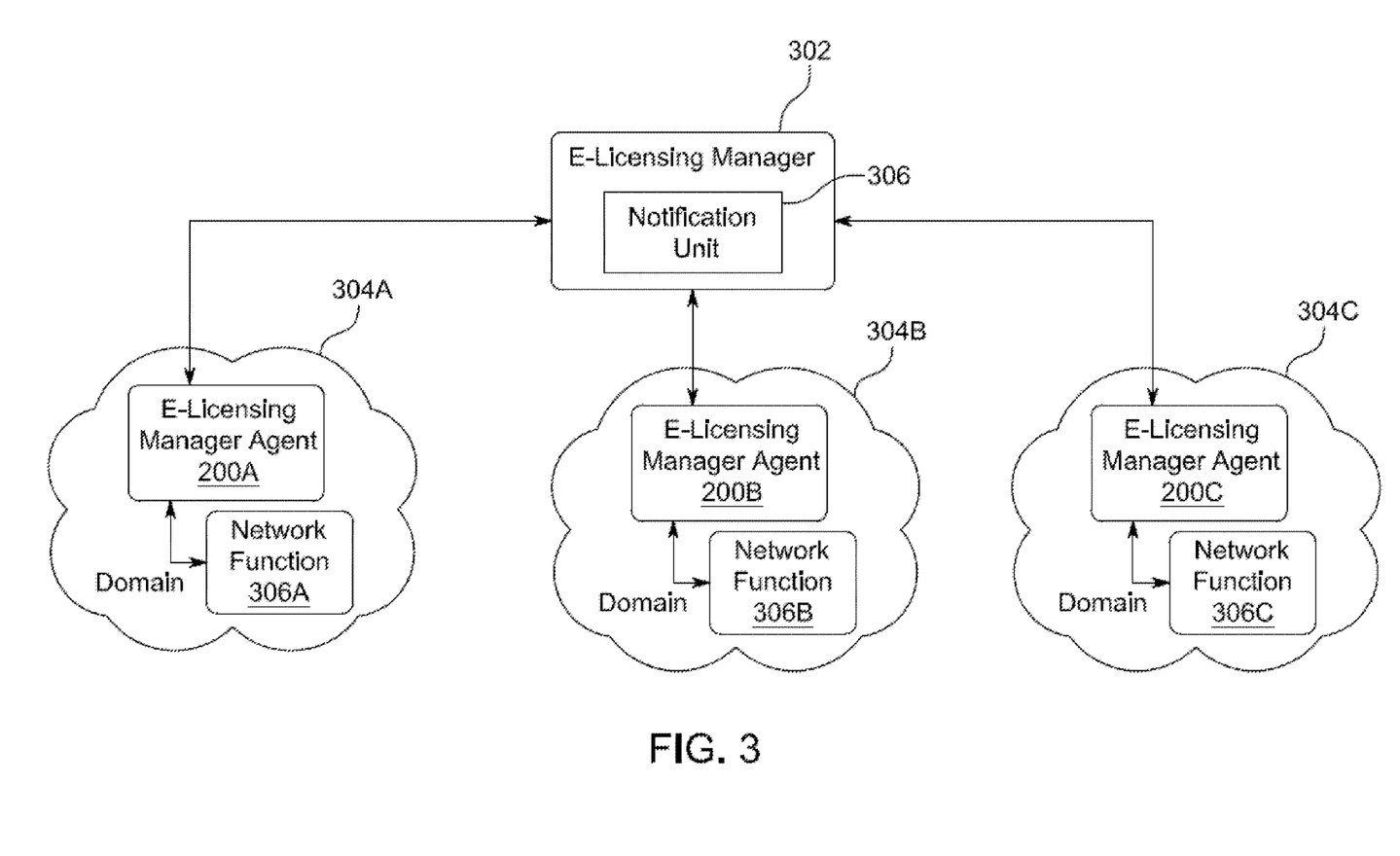
FIG. 3 is a block diagram depicting an e-licensing manager, according to one or more embodiments of the invention.

FIG. 3 is a block diagram depicting an exemplary implementation of an e-licensing manager 302, according to one or more embodiments. FIG. 3 illustrates the e-licensing manager 302 communicatively coupled with the e-licensing manager agents 200A-200C implemented in different domains. The e-licensing manager 302 may correspond to the e-licensing manager 160 of FIG. 1.

The e-licensing manager 302 is a centralized component generated by the licensing engine 116 that manages the e-licensing manager agents 200A-200C and maintains the context of the licensing usage for each instance of the network function 306A-306C. In one or more embodiments, there may be many instances of network functions operating in different domains. For each of the instances of network functions operating in different domains, a corresponding e-licensing manager agent monitors the usage of the instance of the network function based on the corresponding terms and conditions of the licensing agreement. Each of the e-licensing manager agents 200A-200C may maintain a context of usage for the corresponding network function 306A-306C. The e-licensing manager 302 may collect and maintain contexts of the licensing usage for each instance of the network function 306A-306C from the corresponding e-licensing manager agents 200A-200C. The e-licensing manager 302 may provide a standard interface into the e-licensing manager agents 200A-200C to maintain communication.

The e-licensing manager 302 may be configured to support scaling and replication in multi-site and/or multi-domain, in at least one embodiment. The e-licensing manager 302 may have a global view of statuses of the usage of the network function 306A-306C, or their instances declared in every smart contract, independent of location, domain owner, or underlying infrastructure technology. In one or more embodiments, the first party 140 may be able to obtain information of usage of the network function from all the e-licensing manager agents 200A-200C through the e-licensing manager 302. The e-licensing manager 302 may provide the usage information through an API. The e-licensing manager 302 may include a notification unit 306. The e-licensing manager 302 may use the notification unit 306 to notify the first party 140 and/or the second party 150 for any matters such as contract expiration, breach of contract, enforcement of contract terms including contractual obligations, such as royalty payments, and such matters.

As illustrated in FIG. 3, the e-licensing manager agents 200A-200C are deployed at domains 304A-304C, respectively, for corresponding instances of network functions 306A-306C. The domains 304A-304C may be domains of the second party 150 or the third party. The third party may be an infrastructure provider providing required processing and storage resources for the second party 150 to scale up services by requesting or enabling deployment of required instances of the network function. For each instance of network resource deployed, a corresponding e-licensing manager agent is deployed. FIG. 3 illustrates the e-licensing manager agent 200A deployed for an instance of the network function 306A in domain 304A, the e-licensing manager agent 200B deployed for an instance of the network function 306B in domain 304B, the e-licensing manager agent 200C deployed for an instance of the network function 306C in domain 304C. In at least one embodiment, the instances of network function 306A-306C may be instances of the same network function or instances of different functions. As described, each of the e-licensing manager agents 200A-200C monitor corresponding instances of the network function 306-306C in corresponding domains 304A-304C. Each of the e-licensing manager agents 200A-200C may record actions of the second party 150 with respect to corresponding instances of the network function 306-306C in corresponding domains 304A-304C. Each of the e-licensing manager agents 200A-200C may transaction records of corresponding recorded actions in the operation blockchain 130. The e-licensing manager 302 may obtain contexts of usage of the instances of the network function from each of the e-licensing manager agents 200A-200C. Based on the contexts and usage of the instances of the network function by the second party 150, the e-licensing manager 302 may calculate a fee and generate invoices. Although, FIG. 3 illustrates an example of three instances of network functions 306A-306C licensed by corresponding the e-licensing manager agents 200A-200C deployed in corresponding domains 304A-304C, one can appreciate that the example is applicable to N number of network functions.

Figure 4:
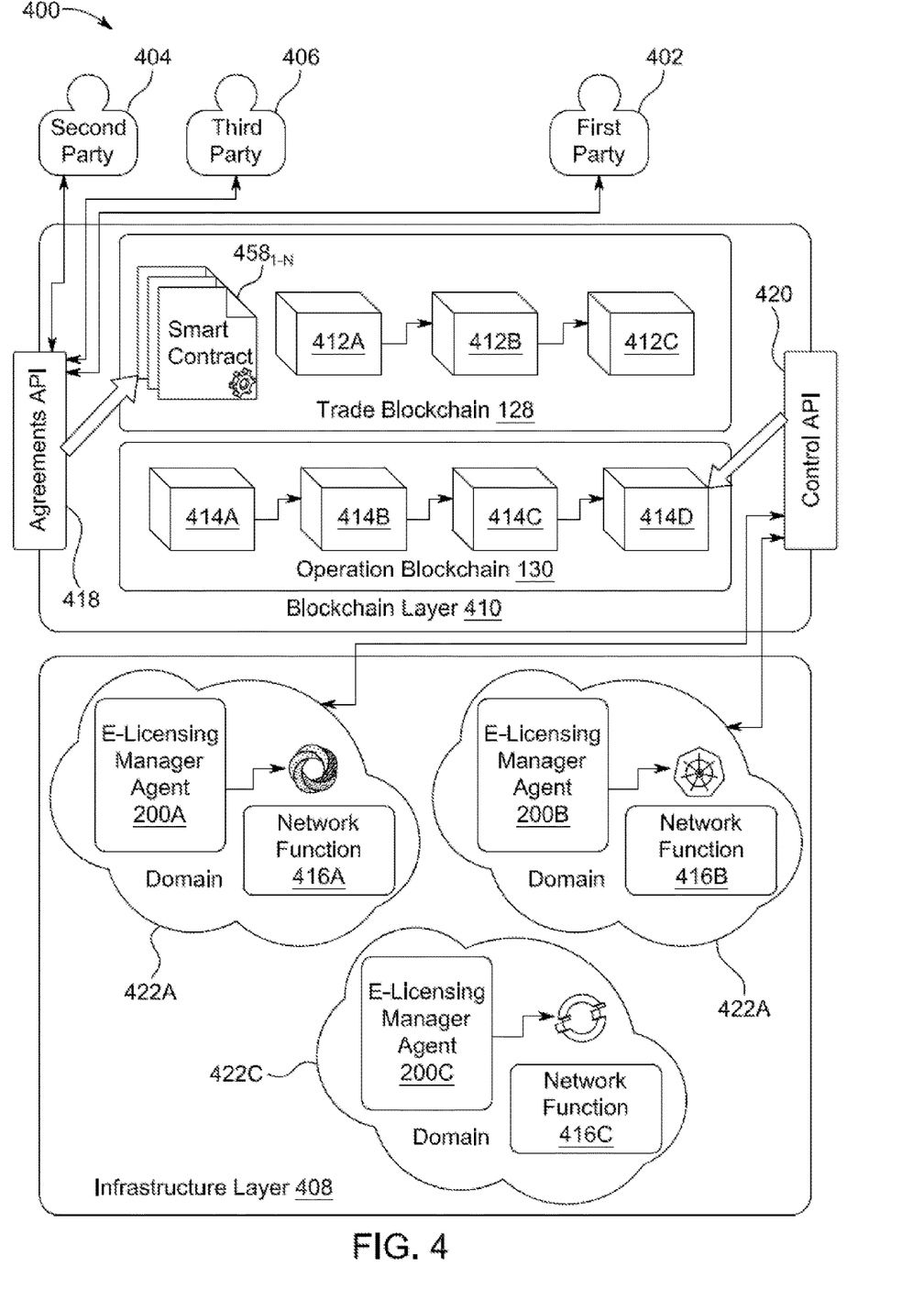
FIG. 4 is a block diagram depicting a licensing management system, according to one or more embodiments of the invention.

FIG. 4 is a block diagram depicting an exemplary implementation of a licensing, management system 400, according to one or more embodiments. FIG. 4 illustrates a first party 402, a second party 404, a third party 406, an infrastructure layer 408, and a blockchain layer 410.

The first party 402 may include vendors who provide network functions. In one or more embodiments, the first party 402 may choose the licensing management unit 102 to provide licenses to use the network function. In one or more embodiments, the licensing management unit 102 (not shown in FIG. 4) may be provided by Atos®. In at least one embodiment, the second party 404 may be a service provider who uses, for example, the network function to provide services to end-users. The third party 406 may be an infrastructure provider providing infrastructure to the second party 404 or the first party 402 to scale the network function.

In one or more embodiments, the first party 402, the second party 404 and the third party 406 may negotiate and agree on licensing agreement(s) that includes terms and conditions with the first party 402, the second party 404, and the third party 406 to use the network functions, for example, a core point of presence orchestrated by Open Source Management And Network Orchestrator (OS MANO). In response to the agreement, the licensing management unit 102 may record a smart contract $458_1$ based on the licensing agreement(s) for the first party 402, the second party 404, and the third party 406 to sign digitally. The smart contract $458_1$ is configured to facilitate, verify and enforce negotiation of the licensing agreement. The second party 404 and the third party 406 may sign the smart contract $458_1$ with the first party 402 to use the network functions. The negotiations, the licensing agreements(s), and the smart contract $458_1$ may be stored in the trade blockchain 128 of the blockchain layer 410 through an agreement API 418 of the blockchain layer 410. The arrow between the agreement API 418 and the trade blockchain 128 indicates persisting of the negotiations, signing of smart contract $458_1$, and storing the smart contract $458_1$ in the trade blockchain 128. In one example, the negotiations, signing of smart contract $458_1$ and storing the smart contract $458_1$ may be stored in a block 412A of the operation blockchain 130. Any changes in agreements, corresponding negotiations, and creation of subsequent smart contracts $458_{2-N}$ may be stored in further blocks 412B, 412C, and so on.

In response to the creation of the smart contract $458_1$, the licensing engine 116 of the licensing management unit 102 may generate an e-licensing manager agent 200A to track the usage of the network function by the second party 404 based on the terms and conditions of the licensing agreement(s). In at least one embodiment, the e-licensing manager agent 200A may be implemented in the second party's domain 422A to monitor the network function 416A. The network function 462A may be implemented in the infrastructure layer 408. The e-licensing manager agent 200A may retrieve the licensing agreement(s) reflected in the smart contract $458_1$ associated with the network function 200A from the trade blockchain 128. Based on the terms and conditions in the licensing agreement(s), the e-licensing, manager agent 200A monitors the usage of the network function by the second party $404_2$ in real-time. In one or more embodiments, the e-licensing manager agent 200A may detect actions of the usage of the network function. The e-licensing manager agent 200A may record the actions of the usage of the network function. The e-licensing manager agent 200A may communicate the recorded actions to create a transaction record in an operation blockchain 130 of the blockchain layer 410. In one or more embodiments, e-licensing manager agent 200A may use a control API 420 of blockchain layer 410 to communicate and create the transaction records in the operation blockchain 130. The arrows between the control API 420 and the e-licensing manager agent 200A indicate the communication of the recorded actions to create transaction records in the operation blockchain 130. The arrow between the control API 420 and the operation blockchain 130 indicates persisting of the transaction records in the operation blockchain 130. In at least one embodiment, the initial transaction records may be stored in a block 414A of the operation blockchain 130. If the block 414A is filled or new transaction records are created due to new smart contracts, the new transaction record may be stored in further blocks 414B, 414C, and so on. Each of the blocks in the trade blockchain 128 and/or the operation blockchain 130 are linked using cryptography, with each block including a cryptographic hash of the previous block, a timestamp, and a smart contract, new agreement(s), leading to a logical chain of events of chronological order.

FIG. 4 also depicts an example where the first party 402, the second party 404 and the third party 406 may use the e-licensing manager agent 200B to monitor usage the network function 416B, for example, a core point of presence that has been scaled to an edge point of presence under Kubernetes control in the third party's domain 422B, according to one or more embodiments. FIG. 4 also depicts an example where the first party 402, the second party 404, and the third party 406 may use the e-licensing manager agent 200C to use the network function 416C, for example, a core point of presence in the second party's domain 422C, according to one or more embodiments. In all the domains 422A-C, the e-licensing manager agents 200A-C manages the licensing in a real-time control in corresponding domains 422A-C, by detecting the use and action on the network function by that the second party 404 and the third party 406 in relation to the licensing agreement(s) that have been signed. The actions detected by e-licensing manager agent 200A-C are persisted in the operation blockchain 130, using the control API 420 creating corresponding transaction records with the consensus of the first party 402, the second party 404, and the third party 406. Although FIG. 4 illustrates an example of having the first party 402, the second party 404, and the third party 406, one can appreciate that the example can he applied to contexts having multiple first parties, multiple second parties, and/or multiple third parties to have one or more smart contracts for usage of one or more network functions such as including create complex service composition or slice deployments in different domains platforms. Although FIG. 4 is explained with respect to a core point of presence as one example, one skilled in the art can appreciate that the e-licensing manager agent can be used or applicable for different network functions where each agent may manage a different network function.

Figure 5:
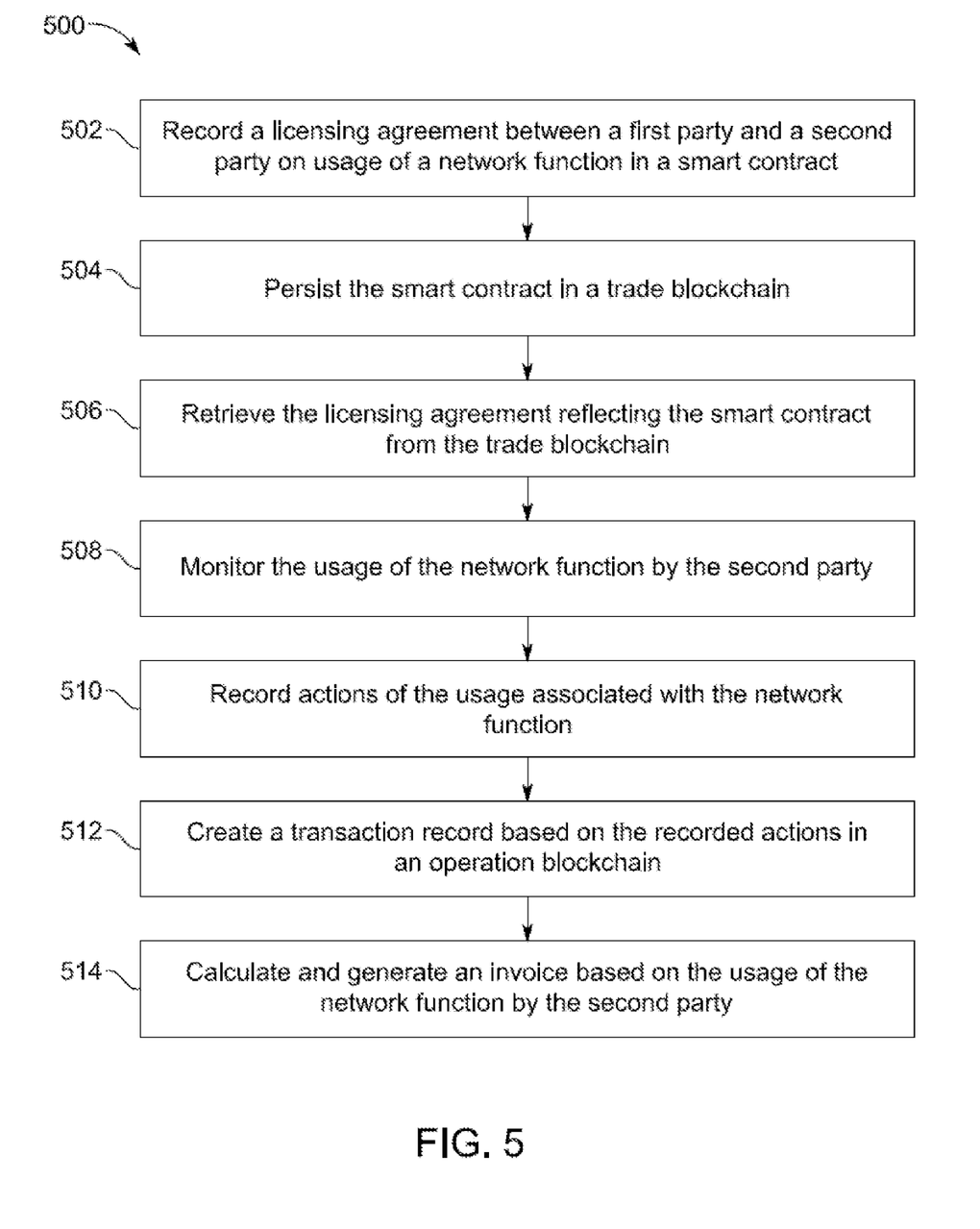
FIG. 5 depicts a process flow for license management, according to one or more embodiments.

FIG. 5 depicts a flowchart of method 500 for provisioning a server, according to one or more embodiments.

In step 502, method 500 includes recording a licensing agreement between the first party 140 and the second party 150 on usage of a network function in a smart contract. The licensing engine 116 of the licensing management unit 102 records the licensing agreement in the smart contract.

In step 504, method 500 includes persisting the smart contract in the trade blockchain 128. The licensing engine 116 persists the smart contract in the trade blockchain 128. In step 506, method 500 includes retrieving the licensing agreement reflecting the smart contract from the trade blockchain 128. In one or more embodiments, the agreement API 208 of the e-licensing manager agent 200 retrieves the licensing agreement.

In step 508, method 500 includes monitoring the usage of the network function. In step 510, method 500 includes recording actions of the usage associated with the network function. In one or more embodiments, the e-licensing manager agent 208 monitors the usage of the network function and recording actions of the usage.

In step 512, method 500 includes creating transaction records based on the recorded actions in the operation blockchain 130. In one or more embodiments, the e-licensing manager agent 208 may create the transaction record based on the recorded actions in the operation blockchain 130 through the control API 212. In one or more embodiments, there may be several actions over a period of lifecycle of licensing control over the network function. The e-licensing manager agent 208 may create the transaction records based on the recorded actions. In at least one embodiment, the transaction records are created periodically. In at least one embodiment, the transaction records are created when there are a threshold amount of actions recorded.

In step 514, method 500 includes calculating and generating an invoice based on the usage of the network function by the second party 150. In one or more embodiments, the e-licensing manager managing the e-licensing manager agent 208 may calculate a fee based on the usage of the of the network function by the second party 150. Further, the e-licensing manager may generate an invoice providing the fee and describing the usage of the network function.

Figure 6:
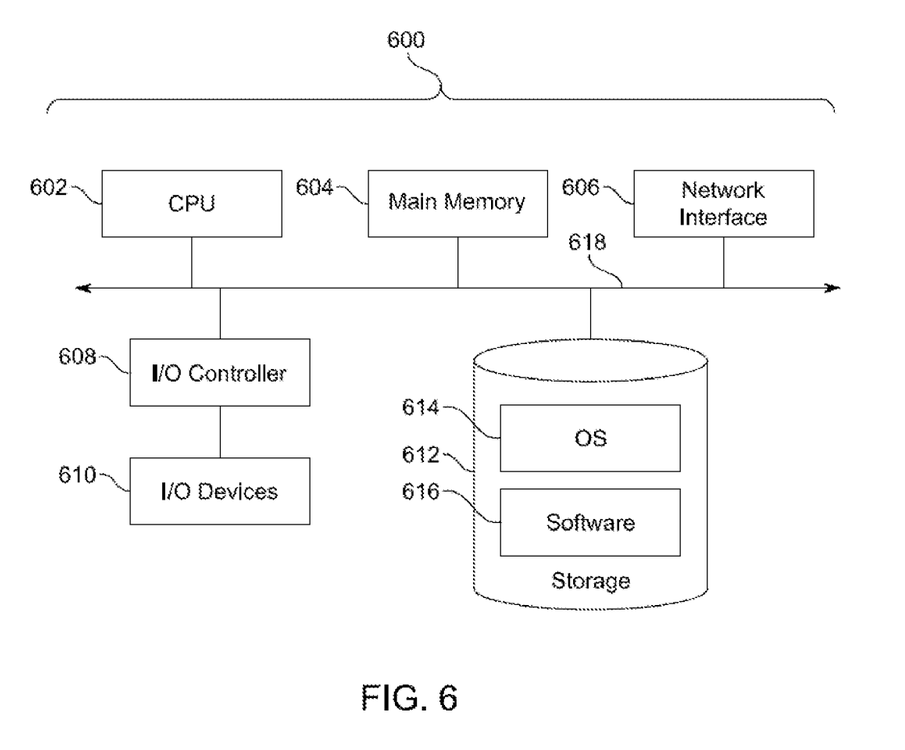
FIG. 6 is a block diagram depicting computing devices useful in connection with the methods and systems described herein, according to one or more embodiments of the invention.

FIG. 6 depicts a block diagram of computing device 600 useful for practicing at least one embodiment of the licensing management unit 102 and/or the blockchain server 104. As shown in FIG. 6, each computing device 600 includes a central processing unit (CPU) 602 and a main memory unit 604. Computing device 600 may further include network interface 606, I/O controller 608, I/O devices 610, storage device 612, and system bus 618. Storage device 612 may include, without limitation, operating system 614 and software 616.

CPU 602 is any logic circuitry that responds to and processes instructions fetched from main memory unit 604. In one or more embodiments, CPU 602 is provided by a microprocessor unit, e.g., those manufactured by Intel Corporation of Mountain View, Calif.; those manufactured by Motorola Corporation of Schaumburg, Ill.; the Arm® processor and Tegra® system on a chip (SoC) manufactured by Nvidia of Santa Clara, Calif.; the POWER7® processor, those manufactured by International Business Machines of White Plains, N.Y.; or those manufactured by Advanced Micro Devices of Sunnyvale, Calif. Computing device 600 may be based on any of these processors, or any other processor capable of operating as described herein. CPU 602 may utilize instruction-level parallelism, thread-level parallelism, different levels of cache, and multi-core processors. A multi-core processor may include two or more processing units on a single computing component. Examples of multi-core processors include the AMD Phenom® IIX2, Intel® Core® i5 and Intel® Core® i7.

Main memory unit 604 may include one or more memory chips capable of storing data and allowing any storage location to be directly accessed by CPU 602. Main memory unit 604 may be volatile and faster than storage device 612. Main memory unit 604 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In one or more embodiments, main memory unit 604 or storage device 612 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory unit 604 may be based on any of the above-described memory chips or any other available memory chips capable of operating as described herein. CPU 602 communicates with main memory unit 604 via system bus 618. In at least one embodiment, CPU 602 may communicate directly with main memory unit 604 via a memory port on CPU 602.

CPU 602 communicates with various I/O devices 610 via system bus 618. Various buses may be used to connect CPU 602 to any of I/O devices 610, including a PCI bus, a PCI-X bus, or a PCI-Express bus, or a NuBus. For one or more embodiments in which I/O device 610 is a video display device, CPU 602 may use an Advanced Graphic Port (AGP) to communicate with the video display device or I/O controller 608 for the video display device. In at least one embodiment, CPU 602 may communicate directly with I/O devices 610 via HYPERTRANSPORT, RAPIDIO, or INFINIBAND communications technology.

A wide variety of I/O devices 610 may be present in computing device 600, according to one or more embodiments. In one or more embodiments, input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

I/O devices 610, in at least one embodiment, may include a combination of multiple input or output devices, including, e.g., Microsoft® KINECT™, Nintendo Wiimote® for the WII, Nintendo WII U GAMEPAD®, or Apple iPhone®. Some I/O devices 610 may allow gesture recognition inputs through combining some of the inputs and outputs. Some I/O devices 610 provide for facial recognition, which may be utilized as an input for different purposes including authentication and other commands. Some I/O devices 610 provide for voice recognition and inputs, including, e.g., Microsoft® KINECT™, SIRI® for iPhone® by Apple, Google Now® or Google Voice-Search®, and Alexa® by Amazon.

I/O devices 610, in at least one embodiment, may have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE™ or Multi-Touch Collaboration Wall, may have larger surfaces, such as on a table-top or on a wall, and may also interact with other electronic devices. Some I/O devices 610 may be augmented reality devices. I/O devices 610 may be controlled by I/O controller 608. I/O controller 608 may control one or more I/O devices 610, such as, display devices, keyboard and pointing device, e.g., a mouse or optical pen. In one or more embodiments, computing device 600 may provide USB connections (not shown) to receive handheld USB storage devices.

I/O devices 610 such as the display devices may be connected to and controlled via I/O controller 608. Display devices may include, e.g., liquid crystal displays (LCD), thin-film transistor LCD (TFT-LCD), blue phase LCD, electronic papers (e-ink) displays, flexible displays, light-emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices may also be a head-mounted display (HMD). In one or more embodiments, display devices or the corresponding I/O controller 608 may be controlled through or have hardware support for OPENGL or DIRECTX API or other graphics libraries.

In one or more embodiments, computing device 600 may include or connect to multiple display devices, which each may be of the same or different type and/or form. As such, in at least one embodiment, any of I/O devices 610 and/or the I/O controller 608 may include any type and/or form of suitable hardware, software, or combination of hardware and software to support, enable or provide for the connection and use of multiple display devices by computing device 600. For example, in at least one embodiment, computing device 600 may include any type and/or form of video adapter, video card, driver, and/or library to interface, communicate, connect or otherwise use display devices. In at least one embodiment, a video adapter may include multiple connectors to interface to multiple display devices. In one or more embodiments, computing device 600 may include multiple video adapters, with each video adapter connected to one or more of display devices. In one or more embodiments, any portion of the operating system of computing device 600 may be configured for using multiple displays. In one or more embodiments, one or more of the display devices may be provided by one or more other computing devices connected to computing device 600, via the one or more networks. In one or more embodiments, software may be designed and constructed to use another computer's display device as second display device for computing device 600. For example, in at least one embodiment, an Apple iPad® may connect to computing device 600 and use the display of computing device 600 as an additional display screen that may be used as an extended desktop. One of ordinarily skilled in the art will recognize and appreciate the various ways and embodiments that computing device 600 may be configured to have multiple display devices.

Computing device 600 may comprise storage device 612 (e.g., one or more hard disk drives or redundant arrays of independent disks) for storing operating system 614 or other related software 616, and for storing application software programs such as any program related to self-service portal for ITSM. Examples of storage device 612 include, e.g., hard disk drive (HDD); optical drive including CD drive, DVD drive, or BLU-RAY drive; solid-state drive (SSD); USB flash drive; or any other device suitable for storing data. Some storage device 612 may include multiple volatile and non-volatile memories, including, e.g., solid state hybrid drives that combine hard disks with solid state cache. Some storage device 612 may be non-volatile, mutable, or read-only. Some storage device 612 may be internal and connect to computing device 600 via system bus 618. Some storage device 612 may be external and connect to computing device 600 via I/O device 610 that provides an external bus. Some storage device 612 may connect to computing device 600 via network interface 606 over one or more networks, including, e.g., the Remote Disk for MACBOOK AIR by Apple. Some storage devices 612 may also be used for installing software and programs. Additionally, operating system 614 and software 616 may run from a bootable medium, for example, a bootable CD, e.g., KNOPPIX, a bootable CD for GNU/Linux that is available as a GNU/Linux distribution from knoppix.net.

Computing device 600 may also install various software programs or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate an installation of software 616 on the licensing management unit 102 and the blockchain server 104. An application distribution platform may include a repository of applications on server or cloud, which the licensing management unit 102 and the blockchain server 104 may access over one or more networks. An application distribution platform may include applications developed and provided by various developers. A user or administrator of the licensing management unit 102 and the blockchain server 104 may select, purchase and/or download an application via the application distribution platform.

Furthermore, computing device 600 may include network interface 606 to interface to one or more networks through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In at least one embodiment, computing device 600 communicates with other computing devices via any type and/or form of gateway or tunneling protocol, e.g., Secure Socket Layer (SSL) or Transport Layer Security (TLS), or the Citrix Gateway Protocol manufactured by Citrix Systems, Inc. Network interface 606 may comprise a built-in network adapter, network interface card, PCMCIA network card, EXPRESSCARD network card, card bus network adapter, wireless network adapter, USB network adapter, modem or any other device suitable for interfacing computing device 600 to any type of network capable of communication and performing the operations described herein.

Computing device 600 depicted in FIG. 6 may operate under the control of operating system 614, which controls scheduling of tasks and access to system resources. Computing device 600 may run any operating system 614 such as any of the versions of the MICROSOFT WINDOWS operating systems, the different releases of the Unix and Linux operating systems, any version of the MAC OS for Macintosh computers, any embedded operating system, any real-time operating system, any open-source operating system, any proprietary operating system, any operating systems for mobile computing devices, or any other operating system capable of running on computing device 600 and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computing device 600 may be any workstation, telephone, desktop computer, laptop or notebook computer, netbook, ULTRABOOK, tablet, server, handheld computer, mobile telephone, smartphone or other portable telecommunications devices, media playing device, a gaming system, mobile computing device, or any other type and/or form of computing, telecommunications or media device that is capable of communication. Computing device 600 may have sufficient processor power and memory capacity to perform the operations described herein. In one or more embodiments, computing device 600 may have different processors, operating systems, and input devices consistent with the device.

In one or more embodiments, computing device 600 is a gaming system. For example, computing device 600 may comprise a PLAYSTATION 3®, or PERSONAL PLAYSTATION PORTABLE® (PSP), PLAYSTATION VITA®, PLAYSTATION 4®, or a PLAYSTATION 4 PRO® device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360® device manufactured by Microsoft Corporation.

In one or more embodiments, computing device 600 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In one or more embodiments, computing device 600 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In one or more embodiments, computing device 600 is a tablet e.g., the IPAD line of devices by Apple; GALAXY TAB family of devices by Samsung; or KINDLE FIRE™, by Amazon.com, Inc. of Seattle, Wash. In one or more embodiments, computing device 600 is an eBook reader, e.g., the KINDLE family of devices by Amazon.com, or NOOK family of devices by Barnes & Noble, Inc. of New York City, N.Y.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A system for license management, the system comprising:
   a computing device comprising a storage device and a processor that runs computer program instructions to implement
      a smart contract configured to record a licensing agreement between a first party and a second party to license a usage of a network function in the smart contract, wherein the smart contract is persisted in a trade blockchain;
      an e-licensing manager agent communicatively coupled to the trade blockchain and the network function, the e-licensing manager agent comprising:
         an agreement Application Program Interface (API),
            wherein said agreement API triggers interaction of the smart contract such that the e-licensing manager agent uses the agreement API to retrieve the licensing agreement reflected in the smart contract associated with the network function from the trade blockchain;
         wherein said smart contract enables a deployment of the network function from the trade blockchain through one or more orchestrators based on terms and conditions of the licensing agreement;
         wherein said smart contract facilitates, verifies, and enforces negotiation of the licensing agreement comprising the terms and conditions, such that in response to generation of the smart contract, the second party is enabled to use the network function;
         wherein said agreement API comprises a software intermediary that enables the e-licensing manager agent and the trade blockchain to exchange information;
      a database comprising a repository that includes
         a licensing registry to store information including licensing information associated with the network function, management of the network function, and the terms and conditions associated with usage of the network function; and
         information required to configure the e-licensing manager agent, the first party and the second party;
      a watcher;
      a translator;
         wherein said e-licensing manager agent is configured to provide the licensing agreement that is retrieved to said translator,
         wherein said translator analyzes said licensing agreement and outlines the terms and conditions of the licensing agreement to said watcher;
         wherein said watcher comprises code or logic and is configured to
            monitor the usage of the network function by the second party in real-time based on the terms and conditions of the licensing agreement to verify compliance of the smart contract, by monitoring actions of the usage of the network function by the second party,
            wherein said actions comprise one or more of usage of the network function within the terms and conditions of the licensing agreement, usage of the network function outside a scope of licensing agreement, violation of the terms and conditions, and such other actions;
            detect whether there are violations in the usage of the network function,
            detect said actions of the usage of the network function by the second party; and
            record said actions of the usage of the network function by the second party;
      a control API configured to create a transaction record in an operation blockchain, based on the actions that are recorded; and
      an interface configured to provide context of the usage of the network function to an e-licensing manager communicatively coupled to said e-licensing manager agent.

2. The system of claim 1, wherein the e-licensing manager agent further comprises a watcher Lifecycle Manager configured to:
   manage a lifecycle and configuration of the watcher;
   receive the actions that are recorded by the watcher; and
   communicate the actions that are recorded to the control API to create the transaction record.

3. The system as claimed in claim 1, wherein the e-licensing manager agent is configured to control the usage of the network function by the second party.

4. The system as claimed in claim 1, wherein the watcher is further configured to perform a real-time audit of the network function for operational decisions.

5. The system as claimed in claim 1, wherein the control API is configured to create a negotiation record in the trade blockchain based upon negotiations between the first party and the second party for the licensing agreement.

6. The system as claimed in claim 1, wherein the e-licensing manager agent is configured to generate a private ledger stored by nodes in the trade blockchain and the operation blockchain, the private ledger being limited to the first party and the second party, the private ledger storing the transaction record of the first party and the second party.

7. The system as claimed in claim 1, wherein the e-licensing manager agent further comprises a watcher generator configured to generate the watcher before a deployment of the network function.

8. The system as claimed in claim 1, further comprising said e-licensing manager configured to monitor the e-licensing manager agent to maintain said context of usage of the network function.

9. The system as claimed in claim 8, wherein the e-licensing manager further comprises a notification unit configured to notify the first party and the second party in response to at least one of an expiration of a term of the licensing agreement and a breach of the terms and conditions of the licensing agreement.

10. The system as claimed in claim 8, wherein the e-licensing manager is further configured to calculate and generate an invoice based on the usage of the network function by the second party.

11. The system as claimed in claim 1, wherein said e-licensing manager is configured to calculate a fee for the usage of the network function by the second party and generate an invoice for the second party.

12. A method for license management comprising, the method being implemented in a computer system having a storage device and one or more physical processors programmed with computer program instructions that, when executed by the one or more physical processors, cause the computer system to perform the method, the method comprising:
recording a licensing agreement via a smart contract between a first party and a second party to license a usage of a network function in the smart contract;
persisting the smart contract in a trade blockchain;
retrieving the licensing agreement via an agreement Application Program Interface (API) of a licensing manager agent,
wherein the licensing manager agent is communicatively coupled to the trade blockchain and the network function,
wherein said agreement API triggers interaction of the smart contract,
wherein the licensing manager agent uses the agreement API to retrieve the licensing agreement reflected in the smart contract associated with the network function from the trade blockchain,
wherein said smart contract enables a deployment of the network function from the trade blockchain through one or more orchestrators based on terms and conditions of the licensing agreement,
wherein said smart contract facilitates, verifies, and enforces negotiation of the licensing agreement comprising the terms and conditions, such that in response to generation of the smart contract, the second party is enabled to use the network function,
wherein said agreement API comprises a software intermediary that enables the licensing manager agent and the trade blockchain to exchange information,
wherein the licensing manager agent includes a database, a watcher, a translator, a control API and an interface,
wherein said watcher comprises code or logic,
wherein the database comprises a repository that includes
a licensing registry to store information including licensing information associated with the network function, management of the network function, and terms and conditions associated with usage of the network function, and
information required to configure the licensing manager agent, the first party and the second party;
providing, via the licensing manager agent, the licensing agreement that is retrieved to the translator;
analyzing the licensing agreement and outlining the terms and conditions of the licensing agreement to the watcher;
monitoring the usage of the network function by the second party, via said watcher, in a real-time based on the terms and conditions of the licensing agreement to verify compliance of the smart contract, by monitoring actions of the usage of the network function by the second party,
wherein said actions comprise one or more of
usage of the network function within the terms and conditions of the licensing agreement,
usage of the network function outside a scope of licensing agreement,
violation of the terms and conditions, and such other actions;
detecting whether there are violations in the usage of the network function;
detecting said actions of the usage of the network function by the second party;
recording said actions of the usage of the network function by the second party;
creating a transaction record in an operation blockchain based on the actions that are recorded; and
providing context of the usage of the network function to a licensing manager communicatively coupled to said licensing manager agent.

13. The method of claim 12, further comprising notifying the first party and the second party in response to at least one of expiration of a term of the licensing agreement and a breach of the terms and conditions of the licensing agreement.

14. The method of claim 12, further comprising creating a negotiation record in the trade blockchain based upon negotiations between the first party and the second party for the licensing agreement.

15. The method of claim 12, wherein said licensing manager calculates a fee for the usage of the network function by the second party and generate an invoice for the second party.

* * * * *